(12) United States Patent
Deady

(10) Patent No.: US 12,225,122 B2
(45) Date of Patent: Feb. 11, 2025

(54) METHOD AND SERVICE CONTINUITY ENCRYPTED STORAGE SOLUTION FOR SECURE OFF-LINE DISTRIBUTION

(71) Applicant: SAUDI ARABIAN OIL COMPANY, Dhahran (SA)

(72) Inventor: Anthony Paul Deady, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 357 days.

(21) Appl. No.: 17/741,648

(22) Filed: May 11, 2022

(65) Prior Publication Data
US 2023/0370259 A1  Nov. 16, 2023

(51) Int. Cl.
*H04L 9/08* (2006.01)

(52) U.S. Cl.
CPC .................. *H04L 9/0869* (2013.01)

(58) Field of Classification Search
CPC ...... H04L 9/0869; H04L 9/065; H04L 9/0861
See application file for complete search history.

(56) References Cited

U.S. PATENT DOCUMENTS 8,345,876 B1 * 1/2013 Sinn ................ H04L 9/0656
380/255
2022/0417000 A1 * 12/2022 Andreadakis ........ H04L 9/0662

OTHER PUBLICATIONS

Kasem-Madani, Saffija, "A Mechanism Design for Privacy-Preserving Computation on Shared Data"; Lecture Notes In Informatics (LNI), Gesellschaft für Informatik; pp. 191-196; 2016 (6 pages).
Information Commissioner's Office (ICO.), "Encryption scenarios"; <https://ico.org.uk/for-organisations/guide-to-data-protection/guide-to-the-general-data-protection-regulation-gdpr/encryption/encryption-scenarios/>; Accessed Oct. 28, 2021 (16 pages).

* cited by examiner

*Primary Examiner* — Mohammed Waliullah
(74) *Attorney, Agent, or Firm* — Osha Bergman Watanabe & Burton LLP

(57) ABSTRACT

A key generator provides a secure key for distribution of Information Technology (IT) service continuity documents. The key generator generates a pseudo-random number, a pseudo-random shift value, and a pseudo-random substitution number. The key generator creates a digit of the secure key by selecting a first digit and a second digit of the pseudo-random shift value based on the pseudo-random substitution number, swapping the first digit and the second digit, calculating a modified American Standard Code for Information Interchange (ASCII) character with the pseudo-random number and the pseudo-random shift value with the first digit and the second digit swapped, and populating a digit of the secure key with the modified ASCII character. The key generator repeats creating the digit of the secure key for a length of the secure key.

18 Claims, 5 Drawing Sheets

300

| IT Business Continuity Group |
|---|
| Service Continuity Encrypted Storage Solution |

| Control Panel | Iterations: 100 | Key Selection: 7 | Generate Keys |
|---|---|---|---|

Random Key Generation (302)

| Position: | 1 2 3 4 5 | 6 7 8 9 10 | 11 12 13 14 15 | 16 17 18 19 20 |
|---|---|---|---|---|
| Key 1: | 9 S Y G Q | H J I O L | H I Y C R | N 2 G E B |
| Key 2: | U B G G G | L K J 6 P | T D P T Y | J N X 6 4 |
| Key 3: | 9 X Q 3 5 | 9 Y C T 4 | T M P Q H | 6 Q H S D |
| Key 4: | F U G O 3 | L V 6 P S | W V U T U | 2 C U X G |
| Key 5: | C 7 Q N 9 | V D I N P | G D W 9 H | E 9 P 7 K |
| Key 6: | R A 6 M H | 0 8 O W K | X U 3 C Y | X T L 3 5 |
| Key 7: | T N 5 N A | A 7 S E W | Z Y L J C | E Y Q O U |
| Key 8: | 5 S C M T | Q 4 3 Q 6 | D I U Q W | T H B U 3 |
| Key 9: | W F U 5 U | E J Y N Y | 8 4 L S 4 | 9 6 5 P 9 |
| Key 10: | 6 G K D O | M P A V L | K 2 D M R | F M 2 A M |

Selected Keys (304)

| Position: | 1 2 3 4 5 | 6 7 8 9 10 | 11 12 13 14 15 | 16 17 18 19 20 |
|---|---|---|---|---|
| Key 1: | 9 S Y G Q | H J I O L | H I Y C R | N 2 G E B |
| Key 2: | U B G G G | L K J 6 P | T D P T Y | J N X 6 4 |
| Key 3: | 9 X Q 3 5 | 9 Y C T 4 | T M P Q H | 6 Q H S D |
| Key 4: | F U G O 3 | L V 6 P S | W V U T U | 2 C U X G |
| Key 5: | C 7 Q N 9 | V D I N P | G D W 9 H | E 9 P 7 K |
| Key 6: | R A 6 M H | 0 8 O W K | X U 3 C Y | X T L 3 5 |
| Key 7: | T N 5 N A | A 7 S E W | Z Y L J C | E Y Q O U |
| Key 8: | 5 S C M T | Q 4 3 Q 6 | D I U Q W | T H B U 3 |
| Key 9: | W F U 5 U | E J Y N Y | 8 4 L S 4 | 9 6 5 P 9 |
| Key 10: | 6 G K D O | M P A V L | K 2 D M R | F M 2 A M |
| Unlock Key: | T N 5 N A | A 7 S E W | Z Y L J C | E Y Q O U |

FIG. 3

METHOD AND SERVICE CONTINUITY ENCRYPTED STORAGE SOLUTION FOR SECURE OFF-LINE DISTRIBUTION

BACKGROUND

Information Technology (IT) Service Continuity, Business Continuity, and general recovery procedures related documents contain information that is required to recover critical IT services in case of an incidence. This information is confidential and sensitive, but essential in recovery of the services.

However, one of the key problems in the contemporary threat landscape is a cyber-attack. A key feature of this threat is the potential loss of company data networks either due to malicious activity or due to actions by a defender to stop an ongoing attack from propagating. Such example is utilizing network containment.

This means that recovery data must be held in a manner not dependent on the network. Additionally, given that an aim of a cyber-attack may be data destruction, an off-line copy of the recovery documents may be the only version that survives the cyber-attack.

Accordingly, there exists a need for securely holding sensitive incident recovery information offline, while maintaining its portability and flexibility of activation and use.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a key generator for providing a secure key for distribution of Information Technology (IT) service continuity documents.

In one or more embodiments, a key generator generates a pseudo-random number, a pseudo-random shift value, and a pseudo-random substitution number. The key generator creates a digit of a secure key by selecting a first digit and a second digit of the pseudo-random shift value based on the pseudo-random substitution number, swapping the first digit and the second digit, calculating a modified American Standard Code for Information Interchange (ASCII) character with the pseudo-random number and the pseudo-random shift value with the first digit and the second digit swapped, and populating a digit of the secure key with the modified ASCII character. The key generator repeats creating the digit of the secure key for a length of the secure key.

In one or more embodiments, the length of the secure key is 20 digits. The pseudo-random shift value is greater than 0 and less than 1. A range of the pseudo-random substitution number is between 1 and 6. The first digit is a number in a decimal place, which is the pseudo-random substitution number from the last decimal place of the pseudo-random shift value. IT service continuity documents are encrypted with the secure key.

In another aspect, embodiments disclosed herein relate to a system for distribution of Information Technology (IT) service continuity documents.

In one or more embodiments, a system includes a plurality of data storage devices, a plurality of key storage devices, and a key generator.

The key generator creates a secure key by generating a pseudo-random number, a pseudo-random shift value, and a pseudo-random substitution number; selecting a first digit and a second digit of the pseudo-random shift value based on the pseudo-random substitution number; swapping the first digit and the second digit; calculating a modified ASCII character with the pseudo-random number and the pseudo-random shift value with the first digit and the second digit swapped; populating a digit of the secure key; and repeating selecting the digits, swapping the digits, and calculating the modified ASCII character for a length of the secure key.

The key generator is repeatedly operated based on a number of repetitions to generate a plurality of secure keys. IT service continuity documents are encrypted with a first key of the plurality of the secure keys, and are stored in the plurality of the data storage devices. The plurality of the secure keys is stored in the plurality of the key storage devices.

In one or more embodiments, a second key of the plurality of the secure keys is stored only in a part of the plurality of the key storage devices. The encrypted IT service continuity documents are decrypted with the second key.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The advantages and features of the present invention will become better understood with reference to the following more detailed description taken in conjunction with the accompanying drawings in which:

FIG. 3 illustrates exemplary keys generated by a key generator, in accordance with one or more embodiments of the disclosure;

DETAILED DESCRIPTION

Figure 1:
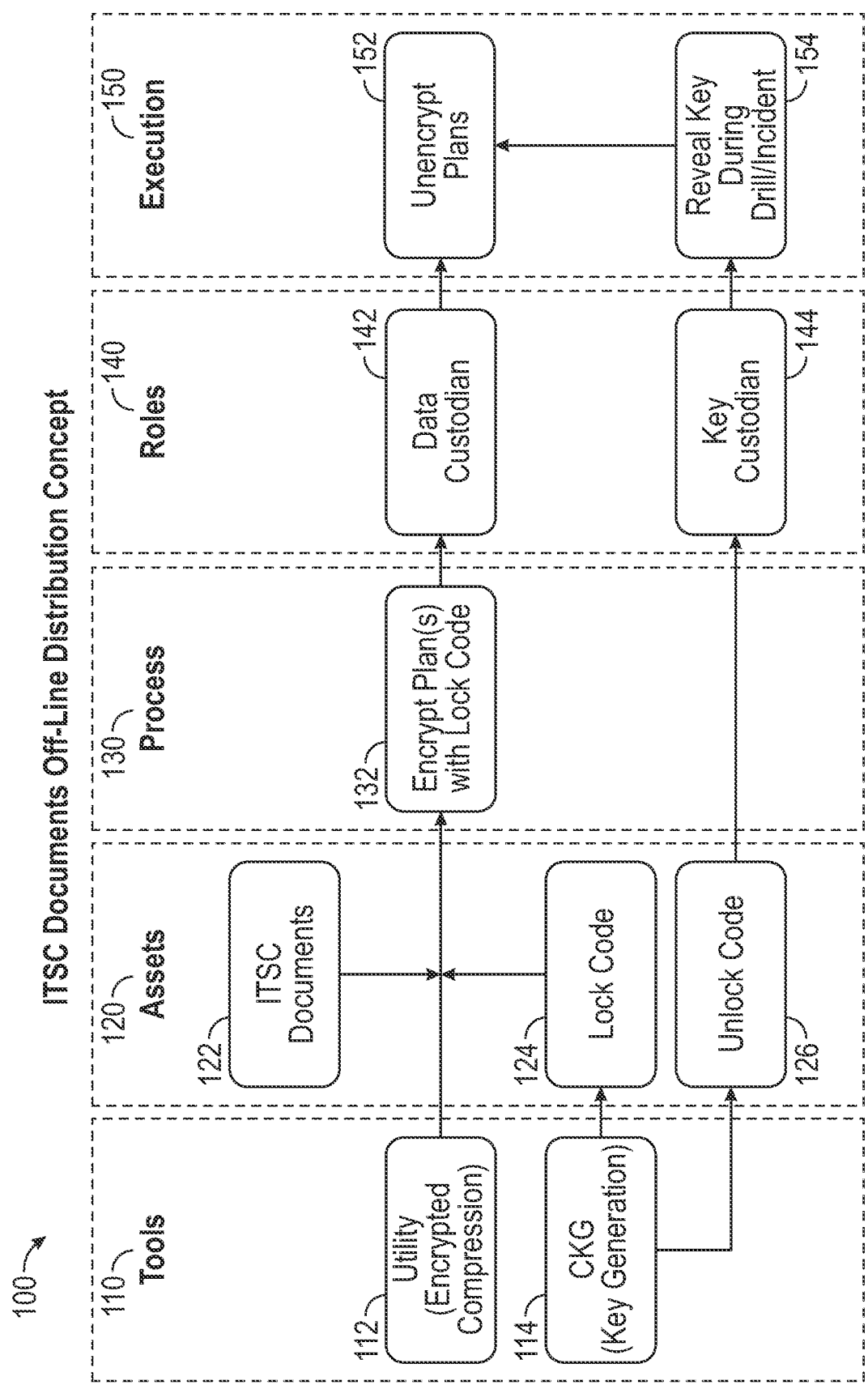
FIG. 1 illustrates an Information Technology Services Continuity documents offline distribution concept, in accordance with one or more embodiments of the disclosure.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology.

Rather, the use of ordinal numbers is to distinguish between the elements. By way of an example, a first element is distinct from a second element, and the first element may encompass more than one element and succeed (or precede) the second element in an ordering of elements.

Information Technology (IT) Service Continuity, Business Continuity, and general recovery procedures related documents contain information that is required to recover critical IT services in case of an incidence. This information is confidential and sensitive, but is essential in recovery of the services.

However, one of the key problems in the contemporary threat landscape is a cyber-attack. A key feature of this threat is the potential loss of company data networks either due to malicious activity or due to mitigation actions by a defender to stop an ongoing attack from propagating. Such example is utilizing network containment.

This means that recovery data must be held in a manner not dependent on the network. Additionally, given an aim of a cyber-attack may be data destruction, an off-line copy of the recovery documents may be the only one that survives the cyber-attack.

Therefore, complexity of data security, which is complete with actionable scripts and tools in an offline manner, is increased because of its inherent physical portability. Accordingly, there exists a need for holding sensitive incident recovery information offline securely, while maintaining its portability and flexibility of activation and use.

In one aspect, embodiments disclosed herein relate to secure offline distribution of sensitive and confidential information to be used during incidents or incident response testing. To provide a secure offline data distribution for recovery documents, a plurality of storage devices and a key generator are needed. Recovery documents, encrypted with an encryption key generated by the key generator, are stored in one or more storage devices. One or more storage devices that does not store the recovery documents stores a plurality of keys including decryption keys selected from the plurality of keys.

Embodiments of the present disclosure may provide at least one of the following advantages. Embodiments disclosed herein enable the encryption and decryption keys to be generated within a closed system. Embodiments disclosed herein allow for custodianship of all data elements within an organization throughout the process without relying on a $3^{rd}$ party solution provider or an outside entity.

FIG. 1 illustrates an Information Technology Services Continuity documents offline distribution concept 100. The distribution concept 100 illustrates secure offline distribution of sensitive and confidential information to be used during incidents or incident response testing. The distribution concept 100 defines resources, roles, and actions. In one or more embodiments, the distribution concept 100 may be divided into multiple (e.g., five) entities including Tools 110, Assets 120, Process 130, Roles 140, and Execution 150. Each entity is a separate column of the workflow shown in FIG. 1 and has specific components within the entity.

The Tools 110 define software programs that will be used in the IT services continuity (ITSC) documents offline distribution. The Tools 110 include a Utility 112 and a CKG 114. Utility 112 encrypts and compresses recovery documents. The CKG 114 is cooperative key generation, which generates keys used for encryption and decryption of the recovery documents. The CKG 114 creates a lock key and randomized lists of unlock keys. These keys resemble software activation keys found on many commercial software products.

The Assets 120 define resources in the ITSC documents offline distribution. The Assets 120 include ITSC documents 122, a Lock Code 124, and a Unlock Code 126. The CKG 114 creates thousands of keys, of which a small subset (e.g., five keys) are selected as the Unlock Code 126. The Lock Code 124 is one of these selected keys for encrypting of the ITSC documents 122. The Unlock Code 126 may be printed on a credit card sized cards or stored in a plurality of portable storage devices. More specifically, for example, the small subset of keys from the thousands generated are printed on credit card sized 'unlock cards.' The unlock cards are provided to a handful of individuals company wide. These individuals are never given access to ITSC documents.

The Process 130 defines a procedure of an offline distribution. Specifically, the process 130 includes a step of encrypting at least one plan with the Lock Code 124. The plan may include universal serial bus (USB) storage devices containing the encrypted ITSC documents 122. The encrypted ITSC documents 112 are compressed and stored in, for example, the USB storage devices.

The Roles 140 define a function or a responsibility of entities inside the Roles 140. The Roles 140 include a Data Custodian 142 and a Key Custodian 144. The Data Custodian 142 is a person who holds the encrypted ITSC documents 122. The USB storage devices holding ITSC documents (i.e., the plan) are distributed to all IT system owners and IT operation critical path handlers (CPHs)

The Key Custodian 144 is a person who holds the Unlock Code 126. The Key Custodian may be, for example, some number of (e.g., ten) individuals in a company. The Data Custodian 142 and The Key Custodian 144 cannot be the same person. That is, no one person may hold both the ITSC documents 122 and the Unlock Code 126 at the same time. This is essential to the distribution concept 100, which the same person does not hold the Assets 120, because the ITSC documents 122 and the Unlock Code 126 cannot be lost at the same time by the same person. Thus, if at any time, either the Unlock Code 126 or the ITSC documents 122 are lost, there is no impact to the security of the IT system.

In one or more embodiment, the Data Custodian 142 and the Key Custodian 144 may be a storage device, and the ITSC documents 122 and the Unlock Code 126 may not be stored in the same storage device. The Storage device may include persistent storage, non-persistent storage, repositories, etc.

The Execution 150 defines actions by the entities in the Roles 140. The Execution 150 includes steps of unencrypting plans 152 and revealing key during an incident response test or an incident 154. In the step of revealing key 152, the Key Custodian 144 reveals the Unlock Code 126 for the encrypted ITSC documents 122. In the step of unencrypting plans 152, the Data Custodian 142 decrypts the encrypted ITSC documents 122 with the Unlock Code 126 revealed by the Key Custodian 144. For example, at a time of an incident response test or an incident, an unlock code is revealed by an authorized incident commander who holds the unlock code, and locked (e.g., encrypted) ITSC documents are unlocked by the authorized plan holder. The Unlock Code 126 and the plan are destroyed in each time they are used.

Figure 2:
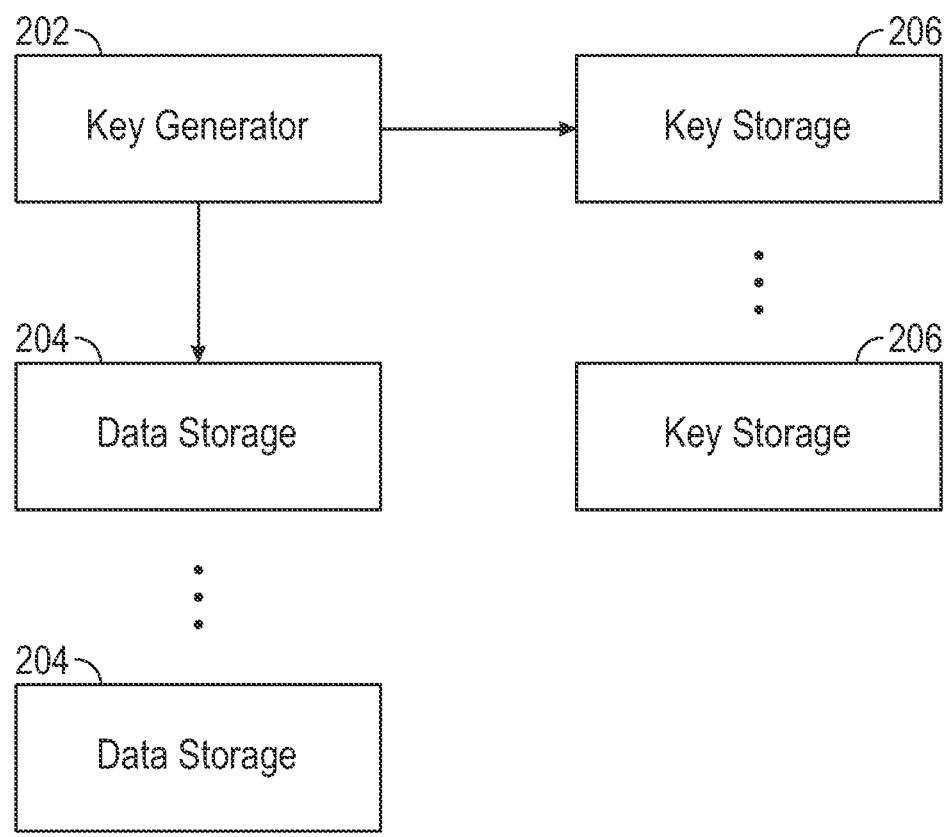
FIG. 2 illustrates an exemplary system architecture, in accordance with one or more embodiments of the disclosure.

FIG. 2 illustrates an exemplary system 200 for implementing the ITSC documents offline distribution concept 100 in FIG. 1. The System 200 includes a Key Generator 202, a Data Storage 204, and a Key Storage 206. In one or more embodiments, The System 200 may include a plurality of the Data Storages 204 and a plurality of the Key Storages 206 as depicted in FIG. 2.

Figure 5:
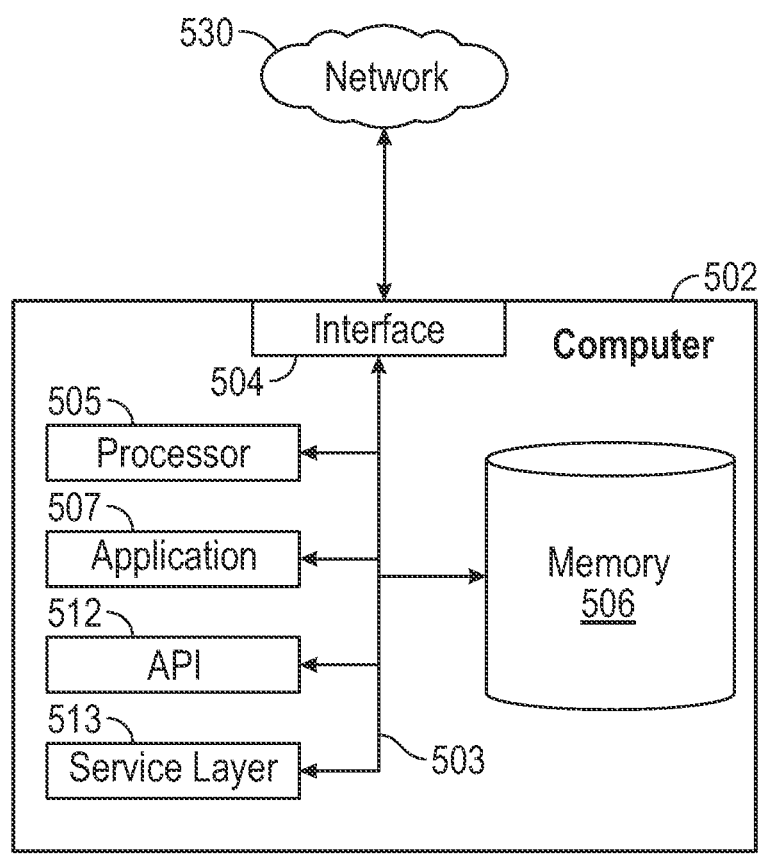
FIG. 5 illustrates computational functionalities associated with the method for generating a key for encryption and decryption of data, in accordance with one or more embodiments of the disclosure.

In one or more embodiments, the Key Generator 202 may be a software running on a general purpose computer such as that shown in FIG. 5 or a dedicated hardware. In one or more embodiments, the Key Generator 202 generates a secure key by performing steps of selecting a number of repetitions, generating pseudo-random numbers, selecting and swapping digits of one of the pseudo-random numbers, calculating a digit of the secure key in American Standard Code for Information Interchange (ASCII) character with the pseudo-random numbers, populating the digit of the secure key, and repeating the process of generating the digit of the key for the length of the key. The Key Generator 202 is repeatedly operated based on the selected number of repetitions for a plurality of secure keys.

The Data Storage 204 is used to store encrypted recovery documents with an encryption key generated by the Key Generator 202. For example, referring to FIG. 1, the encrypted ITSC documents 122 with the Lock Code 126 generated by the CKG 114 are stored in the Data Storage 204. The Key Storage 206 is used to store decryption key generated by the Key Generator 202. For example, referring back to FIG. 1, the Unlock Code 126 generated by the CKG 114 is stored in the Key Storage 206.

In one or more embodiments, the Data Storage 204 and the Key Storage 206 may be a USB flash drive, a USB hard drive, a USB thumb drive, a SD card, a micro SD card, a hard drive in a laptop, and etc. In one or more embodiments, the Key Storage 206 may be a credit card size card with decryption keys printed on it. The Unlock Code 126 may be stored in at least one of a plurality of the Key Storages 206.

As described above, the Key Generator 202 generates secure keys for encryption and decryption of ITSC documents. FIG. 3 illustrates exemplary keys 300 generated by the Key Generator 202. Random Key 302 depicts secure keys generated by the Key Generator 202. While only 10 keys are depicted in FIG. 3, thousands of keys may be generated by the Key Generator 202. Selected Keys 304 depicts a number of keys selected as unlock codes from the thousands of keys. In one or more embodiments, a number of selected keys may be a greater or a smaller than ten as depicted in FIG. 3. Among the Selected Keys 304, one key may be selected as an encryption key and/or a decryption key.

Figure 4:
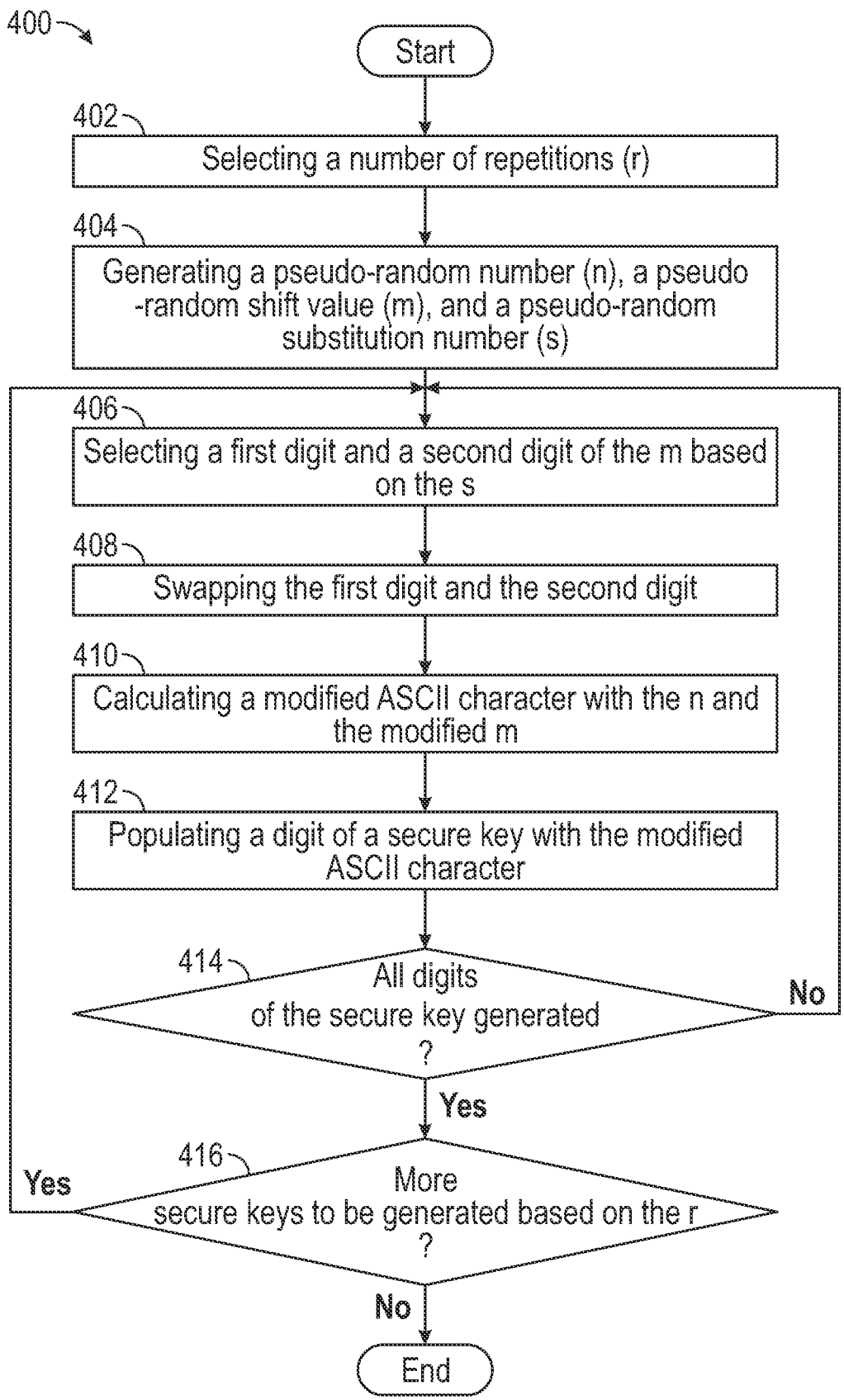
FIG. 4 is a flowchart of a method for generating a key for encryption and decryption of data, in accordance with one or more embodiments of the disclosure.

FIG. 4 is a flowchart of a method 400 for generating a key for encryption and decryption of data. The method 400 may be performed by processing logic that includes hardware (e.g., circuitry, dedicated logic, programmable logic, microcode, etc.), software (e.g., instructions run on a processing device to perform hardware simulation), or a combination thereof. In one or more embodiments, the method 400 may be performed by the Key Generator 202 as described with respect to FIG. 2.

At block 402, a number of repetitions (r) is selected. At block 404, a pseud-random number (n), a pseudo-random shift value (m), and a pseudo-random substitution number (s) are generated. r is a number of keys to be generated. More specifically, in one or more embodiments, r represents a number of overall encryption cycles to run in order to generate a potential field of selectable encryption keys. In one or more embodiments, the m is greater than 0 and less than 1. A range of the s is between 1 and 6.

At block 406, a first digit and a second digit of the m is selected. In one or more embodiments, the first digit is a number in a decimal place, which is the s from the last decimal place of the m. The second digit is a number in a decimal place, which is the (s+2) from the last decimal place of the m. For example, if the m were 0.12345678 and the s is 4, the first digit is 5 and the second digit is 3.

At block 408, the decimal places of the first digit and the second digit are swapped. For example, using the same example above, the m will be 0.12543678 after swapping the digits.

At block 410, a modified ASCII character is calculated with the n, and the modified m, in which two digits are swapped at block 408. In one or more embodiments, for example, a modified ASCII character may be calculated with the below formula.

$$\alpha = n + \text{INT}(\text{MOD}(((m*100), 10)))$$

In this formula, $\alpha$ is a modified ASCII character, INT is an integer operation, and MOD is a modulation operation. The integer operation makes a value a whole number. The modulation operation calculates a remainder when a value is divided by a given number.

At block 412, a digit of a secure key is populated with the modified ASCII character. At decision block 414, if all digits of the secure key were generated, the method 400 moves to decision box 416. If not, the method 400 goes back to block 406 and repeats the steps for a length of the secure key.

At decision box 416, if more secure keys, which are specified by the number of keys (r), need to be generated, the method 400 goes back to block 406 and repeats the steps for the number of keys. If all of the secure keys necessary are generated, the method 400 ends.

For example, when a length of key is 4 and a number of keys to be generated is 4, the method 400 repeats the steps from block 406 to block 412 sixteen times to populate each digit of a secure key and to generate 4 keys. In one or more embodiments, a length of a secure key is 20 digits.

FIG. 5 is a block diagram of a computer system 502 provide computational functionalities associated with the method for generating encryption and decryption keys.

The illustrated computer system 502 is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer system 502 comprises a computer that comprises an input device, such as a keypad, keyboard, touch screen, or other device that can accept user information, and an output device that conveys information associated with the operation of the computer system 502, including digital data, visual, or audio information (or a combination of information), or a GUI.

The illustrated computer system 502 is communicably coupled with a network 530 or cloud. In some implementations, one or more components of the computer system 502 are configured to operate within environments, including cloud-computing-based, local, global, or other environment (or a combination of environments).

At a high level, the computer system 502 is an electronic computing device operable to receive, transmit, process, store, or manage data and information associated with the described subject matter. According to some implementations, the computer system 502 also comprises or is communicably coupled with an application server, e-mail server, web server, caching server, streaming data server, business intelligence (BI) server, or other server (or a combination of servers) via the network 530.

Each of the components of the computer system 502 communicates using a system bus 503. In some implementations, any or all of the components of the computer system 502, both hardware or software (or a combination of hardware and software), may interface with each other or the interface 504 (or a combination of both) over the system bus 503 using an application programming interface (API) 512 or a service layer 513 (or a combination of the API 512 and service layer 513. The API 512 comprises specifications for routines, data structures, and object classes. The API 512 is either computer-language independent or dependent and refer to a complete interface, a single function, or even a set of APIs. The service layer 513 provides software services to the computer system 502 or other components (whether or not illustrated) that are communicably coupled to the computer system 502. The functionality of the computer system 502 is accessible for all service consumers using this service layer. Software services, such as those provided by the service layer 513, provide reusable, defined business functionalities through a defined interface. For example, the interface is software written in JAVA, C++, VB scripts or other suitable language providing generation of keys. While illustrated as an integrated component of the computer system 502, alternative implementations may illustrate the API 512 or the service layer 513 as stand-alone components in relation to other components of the computer system 502 or other components (whether or not illustrated) that are communicably coupled to the computer system 502. Moreover, any or all parts of the API 512 or the service layer 513 are implemented as child or sub-modules of another software module, enterprise application, or hardware module without departing from the scope of this disclosure.

The computer system 502 comprises an interface 504. Although illustrated as a single interface 504 in FIG. 5, two or more interfaces 504 are used according to particular needs, desires, or particular implementations of the computer system 502. The interface 504 is used by the computer system 502 for communicating with other systems in a distributed environment that are connected to the network 530. Generally, the interface 504 comprises logic encoded in software or hardware (or a combination of software and hardware) and operable to communicate with the network 530 or cloud. More specifically, the interface 504 comprises software supporting one or more communication protocols associated with communications such that the network 530 or interface's hardware is operable to communicate physical signals within and outside of the illustrated computer system 502.

The computer system 502 comprises at least one computer processor 505. Although illustrated as a single computer processor 505 in FIG. 5, two or more processors are used according to particular needs, desires, or particular implementations of the computer system 502. Generally, the computer processor 505 executes instructions according to a method and an algorithm of key generation to perform the operations of the computer system 502 and any algorithms, methods, functions, processes, flows, and procedures as described in the instant disclosure to generate encryption and decryption keys.

The computer system 502 also comprises a memory 506 that stores instructions and output data for the computer system 502 or other components (or a combination of both) that is connected to the network 530. In one or more embodiments, the memory 506 may be a non-transitory computer-readable storage medium. For example, the memory 606 stores a key generation method and its output data consistent with this disclosure. Although illustrated as a single memory 506 in FIG. 5, two or more memories are used according to particular needs, desires, or particular implementations of the computer system 502 and the described functionality. While memory 506 is illustrated as an integral component of the computer system 502, in alternative implementations, memory 506 is external to the computer system 502.

The application 507 is an algorithmic software engine providing functionality according to particular needs, desires, or particular implementations of the computer system 502, particularly with respect to functionality described in this disclosure. For example, application 507 serves as one or more components, modules, applications, etc. Further, although illustrated as a single application 507, the application 507 is implemented as multiple applications 507 on the computer system 502. In addition, although illustrated as integral to the computer system 502, in alternative implementations, the application 507 is external to the computer system 502.

There are any number of computers 502 associated with, or external to, a computer system containing computer system 502, each computer system 502 communicating over network 530.

In some embodiments, the computer system 502 is implemented as part of a cloud computing system. For example, a cloud computing system comprises one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which are performed using one or more Internet connections. More specifically, a cloud computing system may operate according to one or more service models, such as infrastructure as a service (IaaS), platform as a service (PaaS), software as a service (SaaS), mobile "backend" as a service (MBaaS), artificial intelligence as a service (AIaaS), serverless computing, and/or function as a service (FaaS).

For purposes of this disclosure, any element mentioned in the singular also includes the plural.

Although some figures depict lines with arrows to represent intra-network or inter-network communication, in other implementations, additional arrows may be included to represent communication. Therefore, the arrows depicted by the figures do not limit the disclosure to one-directional or bi-directional communication.

Whereas many alterations and modifications of the disclosure may no doubt become apparent to a person of ordinary skill in the art after having read the foregoing description, it is to be understood that any particular example shown and described by way of illustration is in no way intended to be considered limiting. Therefore, references to details of various examples are not intended to limit the scope of the claims, which in themselves recite only those features regarded as the disclosure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method for providing a secure key for distribution of Information Technology (IT) service continuity documents, the method comprising:
    generating a pseudo-random number, a pseudo-random shift value, and a pseudo-random substitution number;
    creating a digit of the secure key, comprising steps of:
        selecting a first digit and a second digit of the pseudo-random shift value based on the pseudo-random substitution number;
        swapping the first digit and the second digit;
        calculating a modified American Standard Code for Information Interchange (ASCII) character with the pseudo-random number and the pseudo-random shift value, with the first digit and the second digit swapped; and
        populating a digit of the secure key with the modified ASCII character; and
    repeating the steps of creating the digit of the secure key for a length of the secure key.

2. The method according to claim 1, wherein the length of the secure key is 20 digits.

3. The method according to claim 1, wherein the pseudo-random shift value is greater than 0 and less than 1.

4. The method according to claim 1, wherein a range of the pseudo-random substitution number is between 1 and 6.

5. The method according to claim 1, wherein the first digit is a number in a decimal place, which is the pseudo-random substitution number from the last decimal place of the pseudo-random shift value.

6. The method according to claim 1, wherein the IT service continuity documents are encrypted with the secure key.

7. A system for distribution of Information Technology (IT) service continuity documents, the system comprising:
    a plurality of data storage devices;
    a plurality of key storage devices; and
    a key generator comprising a computer processor for creating a secure key, the key generator configured to:
        generate a pseudo-random number, a pseudo-random shift value, and a pseudo-random substitution number;
        select a first digit and a second digit of the pseudo-random shift value based on the pseudo-random substitution number;
        swap the first digit and the second digit;
        calculate a modified American Standard Code for Information Interchange (ASCII) character with the pseudo-random number and the pseudo-random shift value with the first digit and the second digit swapped;
        populate a digit of the secure key; and
        repeat selecting the digits, swapping the digits, and calculating the modified ASCII character for a length of the secure key,
    wherein the key generator is repeatedly operated based on a number of repetitions to generate a plurality of secure keys,
    wherein the IT service continuity documents are encrypted with a first key of the plurality of the secure keys and stored in the plurality of the data storage devices, and
    wherein the plurality of the secure keys is stored in the plurality of the key storage devices.

8. The system according to claim 7, wherein a second key of the plurality of the secure keys is stored only in a part of the plurality of the key storage devices.

9. The system according to claim 8, wherein the encrypted IT service continuity documents are decrypted with the second key.

10. The system according to claim 7, wherein the length of the secure key is 20 digits.

11. The system according to claim 7, wherein the pseudo-random shift value is greater than 0 and less than 1.

12. The system according to claim 7, wherein a range of the pseudo-random substitution number is between 1 and 6.

13. The system according to claim 7, wherein the first digit is a number in a decimal place, which is the pseudo-random substitution number from the last decimal place of the pseudo-random shift value.

14. A non-transitory computer-readable storage medium storing instructions that, when executed by a processing device, cause the processing device to:
    select a number of repetitions;
    generate a pseudo-random number, a pseudo-random shift value, and a pseudo-random substitution number;
    create a secure key by performing steps of:
        selecting a first digit and a second digit of the pseudo-random shift value based on the pseudo-random substitution number;
        swapping the first digit and the second digit;
        calculating a modified American Standard Code for Information Interchange (ASCII) character with the pseudo-random number and the pseudo-random shift value, with the first digit and the second digit swapped;
        populating a digit of the secure key with the modified ASCII character; and
        repeating the steps of selecting, swapping, calculating, and populating for a length of the secure key; and
    repeat creating the secure key based on the number of repetitions.

15. The non-transitory computer-readable storage medium storing instructions according to claim 14, wherein the length of the secure key is 20 digits.

16. The non-transitory computer-readable storage medium storing instructions according to claim 14, wherein the pseudo-random shift value is greater than 0 and less than 1.

17. The non-transitory computer-readable storage medium storing instructions according to claim 14, wherein a range of the pseudo-random substitution number is between 1 and 6.

18. The non-transitory computer-readable storage medium storing instructions according to claim 14, wherein the first digit is a number in a decimal place, which is the pseudo-random substitution number from the last decimal place of the pseudo-random shift value.

* * * * *